Figure 1:
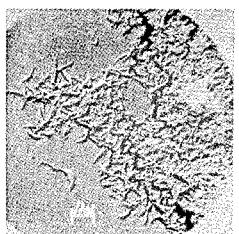

Aug. 4, 1959   H. C. ZWEIFEL ET AL   2,898,298
PROCESS FOR LITHIUM BASE GREASE
Original Filed Dec. 21, 1951   6 Sheets-Sheet 1

GREASE OF EXAMPLE I

HIGH TEMPERATURE
LITHIUM GREASE A

LOW TEMPERATURE
LITHIUM GREASE B

LOW TEMPERATURE
LITHIUM GREASE A

*INVENTORS*
Henry C. Zweifel
Henry J. Voss
Howard D. Gower

BY
*Adams, Forward and McLean*
ATTORNEYS

Aug. 4, 1959     H. C. ZWEIFEL, ET AL     2,898,298
PROCESS FOR LITHIUM BASE GREASE
Original Filed Dec. 21, 1951     6 Sheets–Sheet 2
FIG. 5 – TRANSMITTED LIGHT
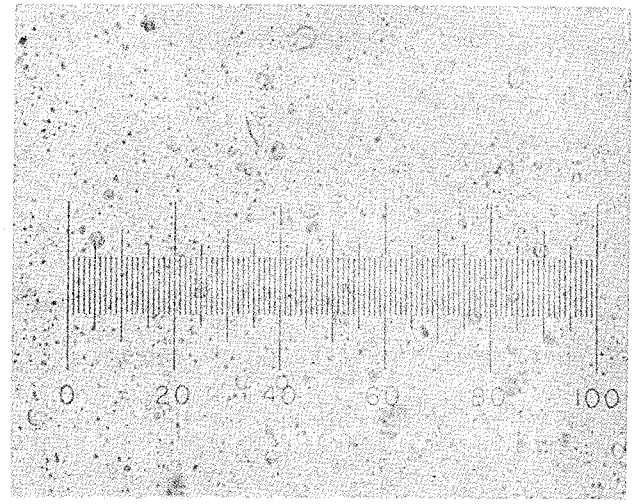
FIG. 6 – VERTICAL ILLUMINATION
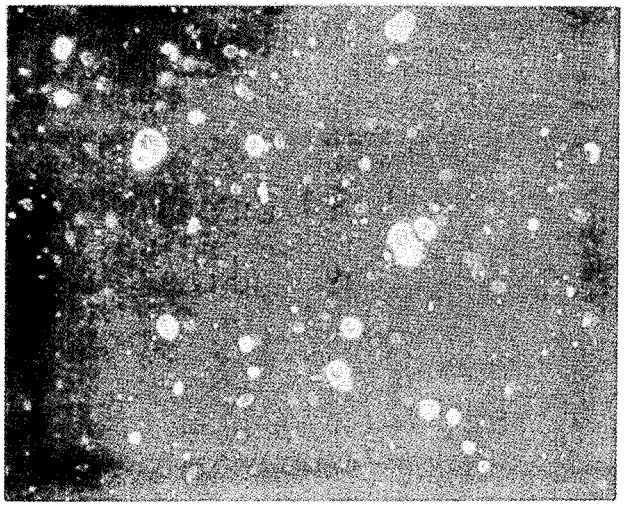
HOMOGENIZED GREASE OF EXAMPLE I
(OPTICAL MICROGRAPHS 155X)
INVENTORS
Henry C. Zweifel
Henry J. Voss
Howard D. Gower
BY
Adams, Forward and McLean
ATTORNEYS

FIG. 7 – TRANSMITTED LIGHT
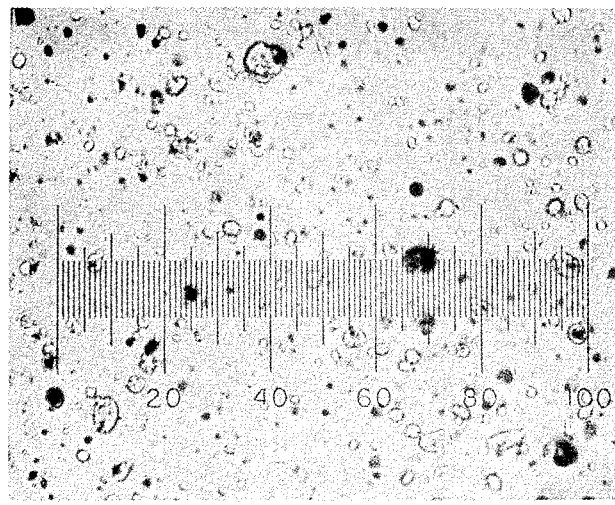
FIG. 8 – VERTICAL ILLUMINATION
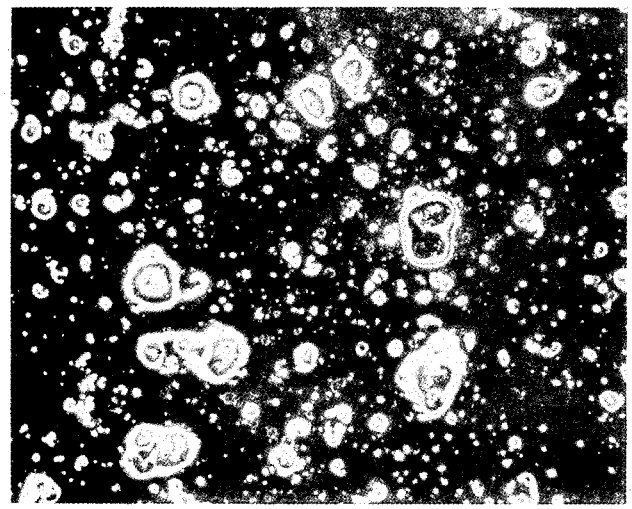
UNHOMOGENIZED GREASE OF EXAMPLE I
(OPTICAL MICROGRAPHS-155X)

Aug. 4, 1959     H. C. ZWEIFEL ET AL     2,898,298
PROCESS FOR LITHIUM BASE GREASE
Original Filed Dec. 21, 1951     6 Sheets-Sheet 4
FIG.9 — TRANSMITTED LIGHT
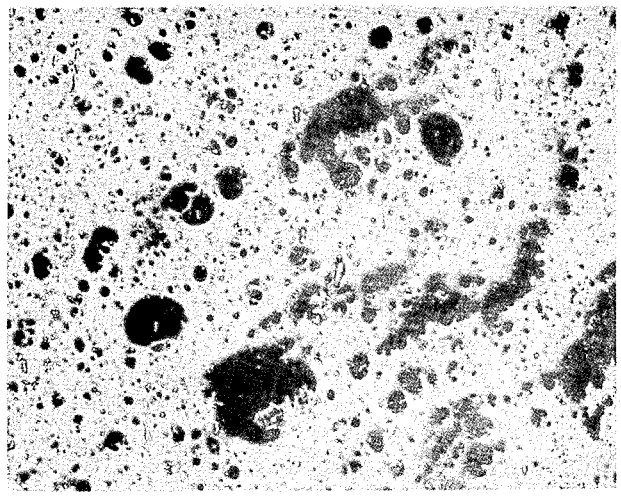
FIG.10 — VERTICAL ILLUMINATION
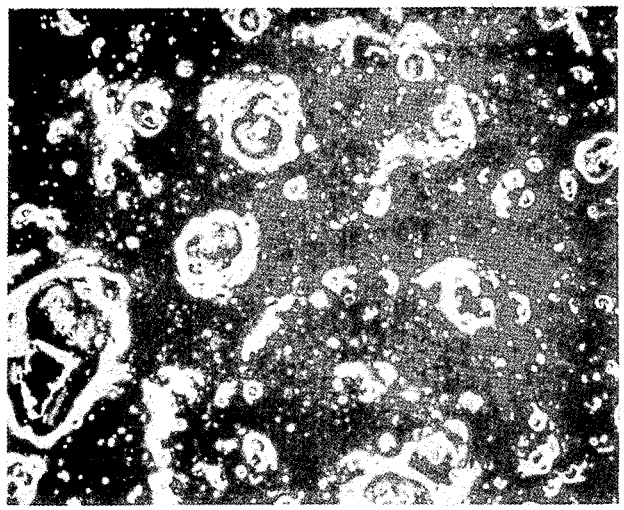
HIGH TEMPERATURE LITHIUM GREASE A
(OPTICAL MICROGRAPHS-155X)
INVENTORS
Henry C. Zweifel
Henry J. Voss
Howard D. Gower
BY
*Adams, Forward and McLean*
ATTORNEYS FIG. 11 TRANSMITTED LIGHT
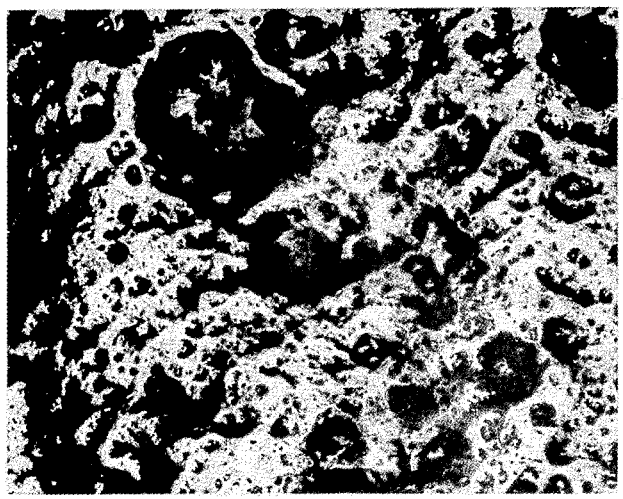
FIG. 12 VERTICAL ILLUMINATION
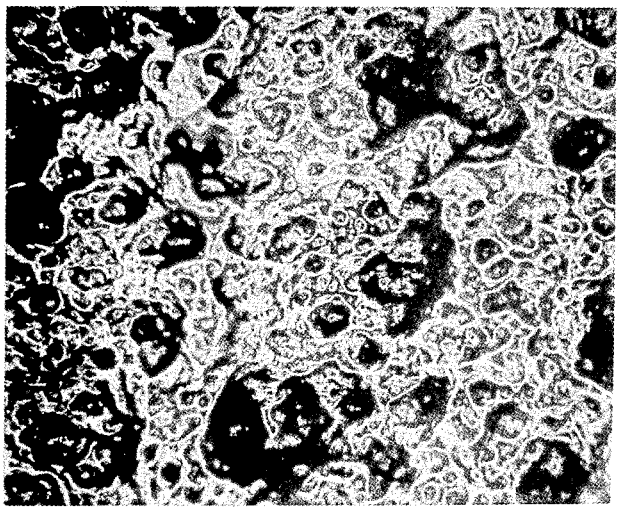
LOW TEMPERATURE LITHIUM GREASE B
(OPTICAL MICROGRAPHS-155X)

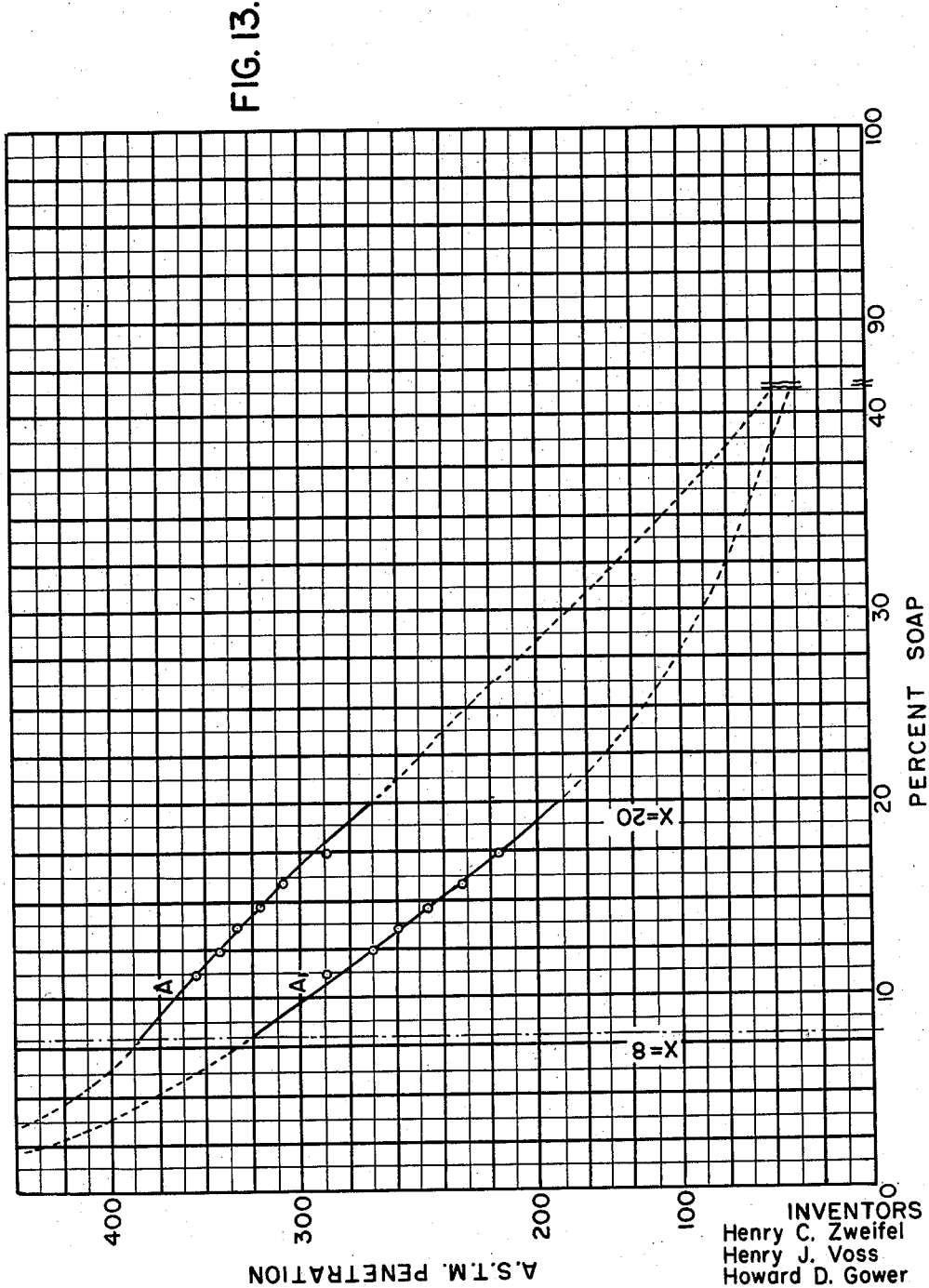

United States Patent Office 2,898,298
Patented Aug. 4, 1959

2,898,298

PROCESS FOR LITHIUM BASE GREASE

Henry C. Zweifel, Inglewood, Calif., Henry J. Voss, Homewood, Ill., and Howard D. Gower, Hammond, Ind., assignors of one-half to Sinclair Refining Company, New York, N.Y., a corporation of Maine, and one-half to Richfield Oil Corporation, Los Angeles, Calif., a corporation of Delaware Continuation of application Serial No. 262,852, December 21, 1951. This application March 16, 1954, Serial No. 416,654

2 Claims. (Cl. 252—41)

Our invention relates to improvements in the manufacture of lithium soap greases and more particularly to an improved lithium soap grease which contains as its gelling ingredient a lithium soap of the glyceride of 12-hydroxy stearic acid characterized by properties of critical fiber size and state of dispersion, homogeneity of gel structure and low soap content for given penetration hardness, which cooperate to produce a significant change in the character and performance of the grease composition.

Lithium greases, particularly those based on lithium soaps of 12-hydroxy stearic acid or its derivatives, are becoming increasingly important commercially particularly because of their value as so-called multi-purpose greases and as high quality greases for certain heavy duty performance conditions. The manufacture of a lithium 12-hydroxy stearate grease however is expensive and is generally considered to require a complicated heating and cooling cycle during the saponification and gelling stages in the course of which kettle temperatures of about 400° to 425° F. are required. Thus expensive special pressure or heating equipment is necessarily of a type not ordinarily employed by grease makers. The proposal has been made to manufacture a lithium grease employing the lithium soap of hydrogenated castor oil by a procedure requiring only the moderate kettle temperature of 330° F. which is attainable in conventional jacketed kettles heated by steam at about 100 pounds per square inch pressure. The resulting grease however is unduly high in cost since a high soap content is required to produce only a soft number one grade product, for example 16.1% soap for a grease having an ASTM penetration of 336 as described in U.S. Patent 2,450,254.

Although previously available lithium greases show in general excellent mechanical stability under laboratory work test conditions, unfortunately their performance in the field under actual working conditions has been disappointing. For example, none of the available lithium greases until the grease of our invention had been found satisfactory under the conditions of the best known nationally conducted field performance test evaluating greases for service as wheel bearing lubricants under heavy duty conditions. All of the previous available greases tested failed in performance due to liquefaction under ordinary service conditions and consequent leakage of the liquefied grease through the wheel assembly seals onto the brakes. Our invention for the first time provides a lithium grease which has been tested satisfactorily under these field test conditions, which is otherwise of high quality and yet which is low in cost relative to the typical lithium greases described in the patent art.

Our new lithium grease is a homogenized lithium grease which contains as its essential gelling ingredient a lithium soap which consists at least to the extent of 50% by weight of a lithium soap of a glyceride of a soap forming hydroxy fatty acid such as the glyceride of 12-hydroxy stearic acid which is commercially available in the form of hydrogenated castor oil. Preferably the lithium soap of hydrogenated castor oil amounts to at least 80 weight percent of the soap content although the use of about 10 to 20% of a lithium soap of a conventional grease making fat, fatty acid or other soap forming organic acid is usually advantageous with respect to cost and appears to be without detriment to quality. We have found that the performance and economy of the grease require a gel structure characterized by a high state of homogeneity in which the bulk of the soap is present in the form of very small fibers of about one micron length, or more broadly within the range of about ¼ to 1½ microns in length, and in which the soap fibers are uniformly dispersed in the gel structure in the form of freely orientable crystals and small crystalline agglomerates. We also have found that the homogenized or milled lithium grease should contain only sufficient soap to represent a difference of from about 25 to 125 ASTM penetration points increase in hardness as a measure of gel strength relative to the same grease in the unmilled state. Then the grease has the homogeneity and well dispersed gel structure necessary for performance in terms of bulk properties and stability, while the cost of the grease is concomitantly reduced with the soap content. On the other hand sufficient excess soap for maximum gelling effect is present in the grease to provide reserve stability or potential gelling capacity under working conditions. We have found that the relationship of soap content to gel strength in terms of ASTM penetration hardness for both the homogenized and unhomogenized grease represents an approximately straight line function over the range of about 8 to 20 weight percent soap on the total weight of the grease and that the benefits associated therewith apparently extend over the entire range of soap contents necessary to produce all NLGI grades of grease from 0 to 5, namely about 5 to 25 weight percent soap.

Our new lithium grease may be prepared in conventional grease making equipment applying the usual techniques known in the art but requires temperature control during the processing and requires homogenization of the hot grease reaction mixture by colloid milling as an essential finishing step. One of the important advantages in terms of the cost of the grease is that it can be made in conventional steam jacketed kettles at a moderate maximum kettle temperature of the order of about 300° to 330° F. In the process of manufacture, the fats and part of the oil base are first charged to the kettle. It is desirable to conduct the saponification step in the presence of oil and a ratio ranging from about equal parts of fat to oil but advantageously about one part of fat to 3 or 4 parts of oil up to all the oil is employed. In general, better yields are obtained by using higher proportions of starting oil but this advantage is limited by foaming tendencies and reduction in kettle capacity.

The oil base may be a mineral oil fraction in the lubricating oil range or other oleaginous oil but if it is a saponifiable oil it should not be present during the saponification stage of manufacture. Preferably a lubricating oil fraction or blend is employed, and for heavy duty automotive greases of the type specified in Timken specification 3599 rev. 2, May 1, 1949, or Ordnance Spec. MIL–G 2108, a mineral oil having a viscosity of about 75 to 100 SSU viscosity at 210° F. is preferred. However oils ranging from a viscosity of about 65 SSU at 100° F. up to a viscosity of about 175 SSU at 210° F. may be readily employed. The oil of course may be solvent refined or conventionally refined by acid treating.

The mixture of fat and oil is usually brought to about 180° to 190° F. to melt the fats before charging the lithium base. The lithium base is added in the form of a boiling aqueous solution of lithium hydroxide monohydrate. The lithium may be employed in other forms however, for example, as lithium hydroxide or oxide or as lithium carbonate. Saponification is effected by agitating the mixture of oil, fat and base at about 180° to 220° F. for say 20 to 30 minutes. Dehydration then is effected by raising the temperature to above 260° F. and preferably to about 300° to 330° F. The temperature should not be raised substantially over about 330° F. if the desired form of ultimate soap fiber particle is to be preserved.

After dehydration has been effected, the grease is finished by reducing the temperature to about 120° to 200° F., preferably about 160° to 170° F. and charging the cooled mixture to a colloid mill. Any desired additives in the way of anti-oxidants, extreme pressure agents, dyes, etc. may be added to the mixture before colloid milling. Unlike previously known lithium greases that have been described in the patent art, no special cooling procedure need be followed. For example, the grease mixture can be cooled in the same kettle used for saponification and dehydration. The cooled kettle sample is softer than the desired consistency of the finished grease and the effect of the colloid milling is to thicken the mixture to the desired grease consistency by completing or extending the gelling operation as well as to impart a characteristic homogeneity of gel structure and texture and a characteristic state of dispersion to the soap fibers within the gel structure.

The colloid milling operation is subject to considerable flexibility in control through control of the variables of inlet temperature, rate of throughput and mill clearance, with decrease in all three tending to increase the yield or the thickening effect. The colloid mill clearances ordinarily vary from 0.003 to 0.040 inch, preferably 0.005 to 0.010. A temperature rise during milling of about 20° to 25° F. is to be anticipated and should be controlled by use of cooling water in the jacket of the colloid mill. The operation usually is once through but multipass milling may be employed. The operation in terms of grease quality is controlled conveniently by ASTM penetration tests. For example, kettle samples and test samples from the mill may be checked for ASTM penetrations. If the milled sample is not within the desired penetration limits, the mixture may be transferred back to the kettle for the addition of more oil, or the colloid mill clearance or with minor discrepancies one of the other controlling conditions, namely throughput or temperature, may be varied to obtain the desired results. We have found however, that it is important to maintain the relationship between soap content and reduction in ASTM penetration as defined above by not reducing the colloid clearances to the minimum possible for maximum hardness in order to leave a residual gelling effect for reserve stability under working conditions. As will be further described in connection with the optical micrographs of the drawings, the soap fibers then are not extended to the maximum dispersion possible but a limited number of small fiber aggregates exist which however do not interfere with free orientability of the fibers or the homogeneity of the gel structure and texture.

The homogenized or milled grease advantageously is deaerated by agitation under reduced pressure, e.g. as in a Cornell homogenizer under a vacuum of 25 inches of mercury, before packaging.

The preparation of various lithium greases according to our invention will be illustrated by means of the following examples:

EXAMPLE I

The following illustrates the manufacture of a typical 90/10 hydrogenated castor oil/beef tallow formula grease (90% hydrogenated castor oil and 10% tallow in the fat charge):

Forty-nine and one half parts commercial beef tallow, 449.5 parts hydrogenated castor oil and 1580 parts of an 81 SUS at 210° F. base oil are charged to a steam jacketed grease kettle and thoroughly mixed at 180° to 190° F. In a separate kettle 76.5 parts of lithium hydroxide monohydrate (54% LiOH) are dissolved in 1344 parts of boiling water. This lithium hydroxide solution is then charged to fat-oil mixture in the first kettle. The mixture is then stirred at 180° to 190° F. for about fifteen minutes. Heat is applied (100-110 p.s.i.g. steam) and the resulting soap base dehydrated at 300° to 320° F. Heat is then shut off and 2012 parts of oil added with stirring. When the grease has reached a temperature of 200° F. or slightly below, 10 parts each of hyamine B (a commercially available aminomethyl alkyl phenol) and octylated arylalkylated diphenyl amine (a commercial product representing the reaction product of di-isobutylene, styrene and diphenylamine) are added. After cooling to 170° F. the grease is processed through a colloid mill (set at 0.010 inch clearance) at a rate of 150 pounds per minute, deaerated and packaged.

The following gives the composition and physical properties of the finished grease:

| | |
|---|---|
| Lithium soap, percent by wt. | 12.15 |
| Petroleum oil (81 SUS at 210° F.), percent by wt. | 86.25 |
| Free alkali, percent by wt. | 0.03 |
| Inhibitors, percent by wt. | 0.50 |
| Penetrations at 77° F.: | |
| Worked penetration— | |
| 60 strokes | 276 |
| 5,000 strokes | 281 |
| 10,000 strokes | 283 |
| 100,000 strokes | 297 |
| Dropping point, ° F. | 379 |
| Wheel bearing tests: | |
| At 40 m.p.h., 220° F. | Pass |
| At 60 m.p.h., 250° F. | Pass |
| Bleeding tests, ANG-10 (at 212° F.), separated oil, percent | 1.5 |
| Cu corr., 24 hrs. at 210° F. | Pass (no stain) |
| Boiling water test, 15 min. | Pass (no turbidity) |

EXAMPLE II

Employing the procedure of Example I, a range of greases varying in the content of the lithium soap of hydrogenated castor oil was made. Attached Table I [1] lists the soap content and physical properties of the greases which were identical in composition except for the different ratios of hydrogenated castor oil/beef tallow used. All soap contents and physical test results are averages of several batches of each formula.

EXAMPLE III

Attached Table II [1] and attached Table III [1] show the effect of colloid milling respectively, a typical 50/50 formula grease and a typical 90/10 formula grease at different mill clearances. Both greases were made following the procedure of Example I. It is to be noted from the worked penetration data that reduction in the mill clearance to the lowest value tested, 0.005", resulted in a grease of initially greater hardness for the same soap content but that the mechanical stability in working was not as good as the greases made at larger mill clearances. This indicates that it is desirable to provide a slightly higher soap to oil ratio than the minimum possible on an initial penetration hardness basis.

EXAMPLE IV

Following the procedure of Example I a grease containing a lithium soap of a mixture of 50 weight percent hydrogenated castor oil and 50 weight percent oxidized microcrystalline wax acids of the type described in U.S.

[1] At end of specification.

Patent 2,590,801 was prepared. The following gives the composition and physical properties of the finished grease:

| | |
|---|---|
| Lithium soap, percent by wt. | 11.3 |
| Petroleum oil (81 SUS at 210° F.), percent | 88.48 |
| Free alkali, percent LiOH | 0.12 |
| Moisture, percent | 0.10 |
| Inhibitors | None |
| Penetrations at 77° F.: | |
| Worked penetration— | |
| 60 strokes | 263 |
| 5,000 strokes | 270 |
| 10,000 strokes | 280 |
| 100,000 strokes | 292 |
| ASTM dropping point, ° F. | 420 |
| Wheel bearing tests: | |
| ASTM | Pass |
| 60 m.p.h., 250° F. | Pass |
| Boiling water test | Pass (no turbidity) |
| ANG–10 bleeding test, percent separated oil | 0.69 |

Figure 2:
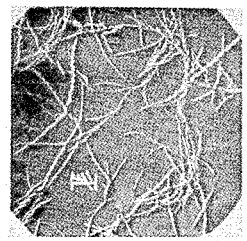

The nature of the soap fibers in the greases of our invention can be observed with the electron microscope. Electron microscopic examination has shown that the fibers are characteristically short semi-twisted fibers of varying length. About 90% of the fibers are slightly below one micron ($1\mu$) in length, with about 10% in the 1 to 2 micron range. Substantially none are greater than 2 microns in length and all appear to be larger than about ¼ micron in length. The width of the fiber varies but is of the order of about 700 angstrom units thickness. The nature and size of the fibers in a typical sample of a grease of the type described in Example I may be observed in the photomicrograph of Figure 1 of the accompanying drawings in which all of the electron micrographs reproduced were taken at a magnification of 3880. By contrast a commercially available lithium grease (high temperature lithium grease A) made at about 425° F. kettle temperature with a lithium soap of 12-hydroxy stearic acid (see U.S. Patent 2,397,956) is shown in Figure 2. The fibers of this type grease are typically symmetrical twisted ribbons of varying lengths with about 60% longer than 5 microns and with 40% in the 1 to 5 micron range. Substantially none are less than one micron. It is important to limit the kettle temperature in processing the grease mixture if the short fiber lengths characteristic of the grease compositions of our invention are to be obtained. We have observed that solution of the soap crystals occurs at about 360° to 400° F. and that upon cooling the soap recrystallizes in the form of the long fibers characteristic of the grease of Figure 2.

Figure 3:
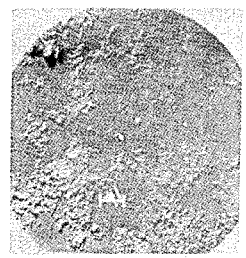

In Figure 3, a similar grease to that of Figure 2 but made at a low kettle temperature approximating 320° F. maximum (low temperature lithium grease A) is shown. The soap component in this grease now consists of granular particles only, with no fibers at all. The unit particles in the granular masses are about 500 angstrom units length.

In order to complete the comparison of known greases employing lithium soaps of 12-hydroxy stearic acid or glyceridic derivatives, a grease manufactured according to the example described in U.S. Patent 2,450,254 was made. This grease (low temperature lithium grease B) may be seen to be a mixture of fibers which are similar to those of the grease of Figure 1 except for the presence of larger randomly shaped particles which account for a substantial amount of the soap mass.

The limitation in the fiber length of the grease compositions of our invention is significant because of the effect of the breakdown of the soap fibers in use. If a grease has a small fiber size in the virgin grease it changes relatively little in length and thus in bulk properties during use. If a grease has a long fiber size in the virgin grease it breaks down to approximately the same limiting size as the smaller fiber grease during use. For example, used grease samples of the type grease shown in Figure 2 taken from the rollers of roller bearings can be seen to consist of particles varying from about 700 angstrom units in length for the bulk of the fibers to a maximum of several microns. The average reduction in size represents on the average a factor of about 50. Obviously, the effect on the bulk properties in the case of the long fiber grease is much more serious than in the case of the small fiber grease which is reduced in size by a factor of only 5 or 10. The significance of this on long term mechanical stability is apparent when it is considered that in wheel bearing tests substantially complete degradation of the virgin fibers in contact with the bearing surfaces occurs within about 30 minutes.

Figure 4:
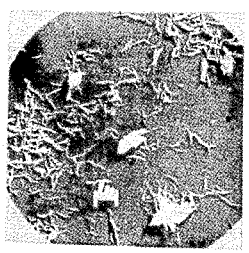

The state of dispersion of the soap fibers in grease compositions of our invention may be seen in Figures 5–12 of the accompanying drawings. Thus in Figure 5, a sample typical of the homogenized grease of Example I is shown as it appears with transmitted light under the optical microscope at a magnification of 155. The texture is quite even with only a few moderately sized aggregates compared to the sample of the same grease before homogenization as illustrated in Figure 7. With dark field vertical illumination under the same conditions, the comparison may be seen more vividly due to the fact that the larger soap aggregates are outlined by a light rim against a dark background. In contrast to the structure characteristic of the grease samples of Example I, the commercial lithium grease (high temperature lithium grease A) shown in Figure 2 of the drawing is seen to contain a number of larger aggregates and to be of fairly uneven texture (Figs. 9 and 10). The texture and gel structure of the grease shown in Figure 4 of the drawings (low temperature lithium grease B) may be seen in Figures 11 and 12 to be of very uneven texture and non-homogeneous. Indeed it is apparent that the gel structure is so dissimilar to that of the other greases as to lack a basis for comparison.

When the above samples were examined under the optical microscope with polarized light between two crossed Nicol prisms, the relative orientation or more properly the orientability of the crystalline fibers imparting gel structure to the grease may be observed through the phenomenon of optical bi-refringence according to which the different indices of refractionation along the different crystallographic axes result in the optical field becoming alternately light and dark in the case of the oriented fibers.

The homogenized grease of Figure 5 displays definite oriented bi-refringence and shows better homogeneity of gel structure than the unhomogenized grease of Figure 7. The unhomogenized grease contains a larger number of agglomerated soap masses in which the fibers are not oriented as they are in the bulk of the grease. In this condition the agglomerated fibers do not add to the gel structure of the grease as they would if they were better dispersed. Also these relatively large masses of soap give an uneven texture to the grease. The number and size of the aggregates in the homogenized grease of Figure 5 is considerably lower. The soap has been dispersed in large part so that it now has become an integral part of the gel structure of the grease yet enough excess soap remains to re-enforce the gel structure under conditions of use. Interestingly enough, the size of the ultimate fibers is not affected by homogenization, for example by a single pass through a colloid mill at 0.003 inch clearance.

The commercial grease of Figure 9 contains a relatively large number of large unoriented soap aggregates although the dispersed fibers display fairly good optical bi-refringence. The grease of Figures 11 and 12, however, does not contain easily orientable fibers and thus does not display optical bi-refringence.

The relationship between soap content and ASTM penetration for the grease compositions of our invention will be described with reference to the curves illustrated in Figure 13 of the accompanying drawings.

Figure 13 is a plot of soap content versus ASTM worked penetration for both unmilled and colloid milled samples of a typical 50/50 hydrogenated castor oil/beef tallow formula lithium grease made in accordance with the procedure of Example I except for the different weights of components used. The solid portions of both curves were drawn from points actually determined on a commercial size batch of grease; whereas the dashed portions of both are extrapolated to indicate the trend of the curves at very high and very low soap contents. It is probable that the curves intersect at some point in the low soap range and at some point in the high soap range, but these points have not as yet been determined.

In the soap content range of about 8% to about 20% both curve A, representing the unmilled grease, and curve $A_1$, representing the same grease after colloid milling, are approximately straight lines. Since this portion of both curves A and $A_1$ is essentially a straight line simple equations can be written for each over the applicable range of soap content (i.e. $X=$ about 8 to $X=$ about 20). Since the curves cannot be extrapolated as straight lines all the way to $X=0\%$ soap the Y axis has been placed at $X=10\%$ soap, which is within the straight line range. For curve A then:

$$|Y=MX^1+P|_8^{20}$$
$$Y=M(X-10)+P$$
$$Y=\frac{366-285}{10-17.5}(X-10)+P$$
$$Y=-10.8(X-10)+P$$
$$Y=-10.8X+(P+108) \quad \text{(Eq. 1)}$$

where:
$M=$ slope
$Y=$ Penetration
$X^1=(X-10)=$ percent soap$-10$
$P=Y$ intercept (at $X-10$)

and for curve $A_1$ $$|Y_1=M_1X^1+Q|_8^{20}$$
$$Y_1=M_1(X-10)+Q$$
$$Y_1=\frac{305-195}{-7.5}(X-10)+Q$$
$$Y_1=-14.7(X-10)+Q$$
$$Y_1=-14.7X+(Q+147) \quad \text{(Eq. 2)}$$

The difference between these two equations shows the change in the soap content—penetration hardness relation of the homogenized grease relative to the unhomogenized grease. Thus:

$$Y=-10.8X+(P+108)$$
$$Y_1=-14.7X+(Q+147)$$
$$\overline{\Delta Y=3.9X+(P-Q)-39}$$

$P=366$ (value of penetration of 10% soap on curve A)
$Q=305$ (value of penetration at 10% soap on curve $A_1$)

$$|\Delta Y=3.9X+22|_8^{20}$$

Hence for any given soap content in the range of about 8 to 20% the penetration decrease (grease hardening) can be determined.
Example:
At $X=14\%$ soap
$\Delta Y=3.9X+22$
$\Delta Y=(3.9)(14)+22$
$\Delta Y=76$ penetration points This is 9 points less than actually shown by the curves but is due to the slight curvature which has been ignored since 9 points on the penetrometer is within the ASTM reproducibility limits for the test.

The equations for the curves for two different grease samples made according to the procedure of Example I and the $\Delta Y$ equation corresponding to each set are set out below:

For the first 90/10 formula grease:
$Y=-10.8X+108+P_2$     $(P_2=326)$
$Y=-14.7X+147+Q_2$     $(Q_2=292)$
$\Delta Y=3.9X-5|_8^{20}$ For the second 90/10 formula grease:
$Y=-10.8X+108+P_3$     $(P_3=333)$
$Y=-14.7X+147+Q_3$     $(Q_3=310)$
$\Delta Y=3.9X-16|_8^{20}$ The equations are based on assumption that the lines for the unmilled greases are all parallel with a slope of $-10.8$ and that the lines for the milled greases are all parallel with a slope of $-14.7$. Some grease batches will give curves of different slopes but the same type equations hold. In the case of different slopes the number preceding X in the $\Delta Y$ equation changes as well as the constant.

These data show the large saving in soap requirement characteristic of the colloid mill greases of our invention and show that a reduction of one to two entire NLGI grades are common. Some other batches have given as much as 100 points decrease in penetration without exceeding the point of optimum reduction in soap content. With respect to the yield increase possible, an expectation of 25 to 125 penetration points is not unreasonable depending on milling conditions (mill clearance, flow rate and temperature). The usual spread is about 40 to about 80 points. Also, although the straight line relationship appears to hold only over the soap content range of about 8% to about 20%, there is a definite advantage to colloid milling at lower and higher soap contents so that the benefits actually extend over a range of about 5% soap to about 25% and thus cover all NLGI grades from No. 0 to No. 5.

The performance characteristics of our new grease composition are best described by reference to actual field trials conducted by an independent authority on grease evaluation and specification having national recognition. The grease composition described in Example I was tested by use on the rear wheels of two buses of a municipal bus line. The buses were typical large General Motors buses, G.M.-71 diesel powered with double rear wheels. The first bus, with 19,777 miles on the wheel bearing test, was inspected and it was found that the bearings and grease were in good condition. The rollers where they showed through the grease were smooth and well lubricated with no signs of scratching, heat spots or varnish. The used grease was dark in color as would be expected but showed no signs of liquefaction. Consistency was well maintained as was indicated by "fingers" of grease sticking out in all directions. There was no odor of oxidation in the used grease. The second bus which also had travelled approximately 20,000 miles was found upon inspection to be in the same condition as the first as to the left rear wheel. For example, the absence of liquefaction could be shown by making a furrow to the bottom of the layer of grease in the hub in about the 7 o'clock position. The shape of the furrow did not change and its perpendicular walls showed no evidence of collapse. The right rear wheel of the second bus differed from the others in that the grease was softer and approached a semi-fluid condition although it showed the same good lubrication as the others. However, inquiry revealed that during the test period drivers of the bus had complained that the bus was dragging on this wheel which must have caused the whole assembly to run at a much higher temperature than the other wheels. The grease however did not become sufficiently soft to leak out and all of the original charge was still in the assembly so that the used grease was officially approved as satisfactory. The used grease in the first three wheels inspected was approved as in excellent condition. The testing authority stated that all other lithium greases previously field tested had become truly liquid at some time during the 20,000 miles of service and that substantially all of the grease in the assembly had disappeared by running through the seals onto the brakes and out onto the tires and road. Since these large hubs must contain between 1 and 2 pounds of grease such liquefaction makes for a dangerous brake condition and eventually leaves the wheel bearings dry.

*Table I*

| Hydrogenated Castor Oil/Tallow Ratio | 50/50 | 65/35 | 70/30 | 75/25 | 80/20 | 90/10 | [1] 100/0 |
|---|---|---|---|---|---|---|---|
| Soap Content, Percent | 11.3 | 8.02 | 8.13 | 8.96 | 12.2 | 11.8 | 12.6 |
| Free Alkali, Percent LiOH | 0.00 | .04 | .03 | .05 | .133 | .05 | --------- |
| Penetrations: | | | | | | | |
| Worked— | | | | | | | |
| 60 strokes | 288 | 279 | 272 | 280 | 272 | 278 | 283 |
| 10,000 strokes | 312 | 287 | 283 | 286 | 275 | 285 | 290 |
| 100,000 strokes | 333 | 304 | 303 | 303 | 276 | 296 | 302 |
| Points Increase | +45 | +25 | +31 | +23 | +4 | +18 | +19 |
| Dropping Point, °F | 358 | 362 | 365 | 367 | 372 | 378 | 387 |
| ANG-10 Bleed Test, Percent Separated Oil | 3.60 | 6.64 | 5.46 | 5.93 | 2.81 | 3.35 | 0.54 |
| Wheel Bearing Test (60 m.p.h., 250° F.) | Pass—fair | Pass—fair | Pass—fair | Pass—fair | Pass—good | Pass—good | Pass—good |
| Leakage, grams | 2.0 | 3.6 | 3.1 | 2.4 | 0.1 | 0.0 | 0.0 |
| Alcoa Water Leaching, Percent Loss | 3.34 | 3.33 | 3.41 | 3.00 | 2.29 | 2.54 | --------- |
| Boiling Water Test | OK | OK | OK | OK | OK | OK | OK |
| Colloid Mill Clearance, inches | [2] .005 | .006 | .006 | .006 | .010 | .006 | .005 |

[1] Laboratory batch.
[2] Laboratory colloid mill.

*Table II*

| Colloid Mill Clearance, Inches | Unmilled | 0.020 | 0.010 | 0.005 |
|---|---|---|---|---|
| Soap Content, percent | 9.9 | 9.9 | 9.9 | 9.9 |
| Penetrations at 77° F.: | | | | |
| Worked— | | | | |
| 60 strokes | 312 | 292 | 285 | 273 |
| 10,000 strokes | 310 | 303 | 300 | 296 |
| 100,000 strokes | 331 | 323 | -------- | 310 |
| Points Increase (60-100,000) | +19 | +31 | -------- | +37 |
| Dropping Point, °F | 361 | 358 | 356 | 359 |
| ANG-10 Bleed Test, percent Separated Oil | 9.10 | 5.23 | 3.85 | 3.60 |
| Boiling Water Test | OK | OK | OK | OK |

*Table III*

| Colloid Mill Clearance, Inches | Unmilled | 0.010 | 0.005 |
|---|---|---|---|
| Soap Content, percent | 13.0 | 10.5 | 10.5 | 10.5 |
| Free Acid as Oleic, percent | 0.103 | 0.08 | 0.08 | 0.08 |
| Penetrations: | | | | |
| Worked— | | | | |
| 60 strokes | 283 | 321 | 295 | 284 |
| 10,000 strokes | 275 | -------- | 298 | 286 |
| 100,000 strokes | 267 | -------- | 298 | 297 |
| Points Increase (60-100,000) | -16 | -------- | +3 | +13 |
| Dropping Point, °F | 374 | -------- | 375 | 376 |
| ANG-10 Bleed Test, percent Separated Oil | 1.95 | -------- | 3.06 | 3.21 |
| Wheel Bearing Test (60 m.p.h., 250° F.) | Pass | -------- | Pass | Pass |
| Leakage, Grams | 1.5 | -------- | 0.7 | 0.5 |
| Boiling Water Test | OK | -------- | OK | OK |

This application is a continuation of our copending application, S.N. 262,852, filed December 21, 1951, now abandoned.

We claim:

1. In the manufacture of a lithium grease of a mineral oil base and about 5 to 25 weight percent on the grease of a lithium soap of which at least 80% by weight is a lithium soap of hydrogenated castor oil, which grease is characterized by uniform homogeneity and dispersion of gel structure and by the presence of the soap in the form of fibers of about 1 micron length, which comprises saponifying the fatty component with an aqueous lithium base in the presence of at least a portion of the total oil base to be used in the grease composition, dehydrating the mixture at a maximum temperature of about 330° F., adding any additional amount of oil base needed to formulate the grease, and colloidally milling the unhomogenized grease to provide gel strength in terms of ASTM penetration for the homogenized grease equivalent to about 25 to 125 penetration points increase in hardness relative to that of the grease in the unhomogenized state.

2. In the manufacture of a lithium grease of a mineral oil base and about 5 to 25 weight percent on the grease of a lithium soap of which about 90% by weight is a lithium soap of hydrogenated castor oil and the balance is a lithium soap of beef tallow, which grease is characterized by uniform homogeneity and dispersion of gel structure and by the presence of the soap in the form of fibers of about 1 micron length, which comprises saponifying the fatty component with an aqueous lithium base in the presence of at least a portion of the total oil base to be used in the grease composition, dehydrating the mixture at a maximum temperature of about 330° F., adding any additional amount of oil base needed to formulate the grease, and colloidally milling the unhomogenized grease to provide gel strength in terms of ASTM penetration for the homogenized grease equivalent to about 25 to 125 penetration points increase in hardness relative to that of the grease in the unhomogenized state.

References Cited in the file of this patent

UNITED STATES PATENTS

| 2,397,956 | Fraser | Apr. 9, 1946 |
| 2,444,720 | Bell | July 6, 1948 |
| 2,450,221 | Ashburn et al. | Sept. 28, 1948 |
| 2,450,222 | Ashburn et al. | Sept. 28, 1948 |
| 2,450,254 | Puryear et al. | Sept. 28, 1948 |
| 2,652,365 | Moore et al. | Sept. 15, 1953 |
| 2,652,366 | Jones et al. | Sept. 15, 1953 |
| 2,666,033 | Dilworth | Jan. 12, 1954 |
| 2,697,693 | Browning et al. | Dec. 21, 1954 |
| 2,704,363 | Armstrong | Mar. 15, 1955 |